June 1, 1943. V. GREY 2,320,360
QUICK-CHANGE DEVICE
Filed Nov. 5, 1941

INVENTOR.
VICTOR GREY
BY J.H.B. Whitfield
ATTORNEY.

Patented June 1, 1943

2,320,360

UNITED STATES PATENT OFFICE 2,320,360

QUICK-CHANGE DEVICE

Victor Grey, Chicago, Ill., assignor to Teletype Corporation, Chicago, Ill., a corporation of Delaware Application November 5, 1941, Serial No. 417,884

1 Claim. (Cl. 279—79)

The present invention relates to rotary machine tool chucks and particularly to devices wherein processing tools may be inserted and removed without arresting rotation of the chucks.

In the operation of rotary machining devices it becomes necessary at times to change from one processing tool to another while performing operations upon certain pieces of work. It is desirable that these operations be performed with facility and with as little loss of operating time as possible. Accordingly, the withdrawal and insertion of several successively used tools may be more economically and efficienly performed if, without incurring undue hazard, interchangeability may be effected without having to wait for acceleration and deceleration of the processing spindle.

An object of this invention is to provide an easily manipulative quick-change chuck of simple and economical construction which will enable the interchange of tools to be effected efficiently and rapidly.

In a preferred embodiment of the invention a quick-change chuck is provided which comprises a power-driven chuck sleeve having a conical recess which converges inwardly terminating in a recess of polygonal cross section into which extend a plurality of radially disposed spring pressed pins. A removable tool holder has formed thereon conical and polygonal portions conforming with the corresponding recesses of said chuck. Carried at the top of the tool holder beyond its polygonal portion is a lead pin having an annular groove with which the spring pressed pins of the chuck cooperate to retain the tool holder in engagement with the chuck.

The invention may be more readily understood by reference to the drawing and the following specification:

Figure 2:
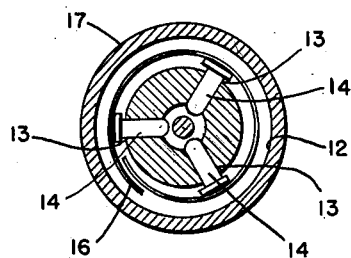
Fig. 2 is a plan section of the chuck taken along the line 2—2 of Fig. 1.

Referring to the drawing, 4 is a chuck having a conical recess 5 which is adapted to receive the complementary formed portion 6 of a tool holder indicated generally at 7. Immediately above the conical recess 5 is a recess 8 of hexagonal cross section which is adapted to receive the hexagonal portion 9 of the tool holder in order to establish a driving connection between the tool holder and the chuck. The polygonal portion 9 of the tool holder is located immediately above conical portion 6. Tool holder 7, at its upper end, carries a lead pin 10 in which is formed a peripheral groove 11.

Figure 1:
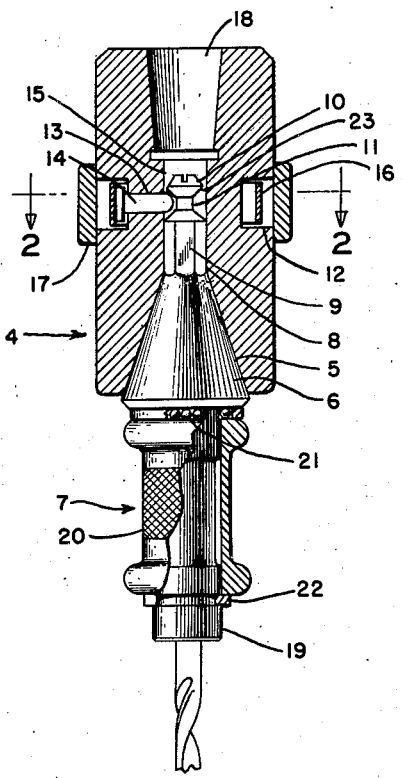
Fig. 1 is a side view partially broken away and in section of the chuck and tool holder.
Figure 3:
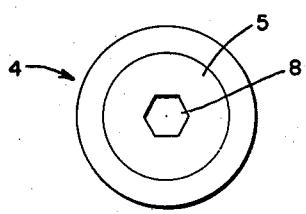
Fig. 3 is a bottom view looking into the central core of the chuck.

It is to be noted that the hexagonal portion 9 of the tool holder or collet is somewhat longer than the lead pin which is formed directly above it, Fig. 1, so as to assure driving engagement between the chuck 4 and the tool holder prior to contactual engagement between the lead pin and the retainer pins 14 for engaging the lead pin as will now be described. In this way, when the chuck is in rotation at the time the collet is inserted, the latter member is first brought up to speed before engagement is effected and thereby unnecessary wear upon the retainer pins 14 is prevented.

A peripheral recess 12 is provided in chuck 4, from which extend inwardly a plurality of holes 13 which are adapted to receive a plurality of pins 14 which extend from said recess into the cylindrically formed opening 15 of the chuck which is located immediately above the polygonal recess 8. The retainer pins are provided with means for urging them inwardly toward the cylindrical opening 15, consisting of a circular girdle spring 16 confined in recess 12 under tension and in engagement with the pins 14. As the girdle spring 16 urges the pins inwardly to engage the latter groove 11 in lead pin 10 of the tool holder the tool holder is thrust upwardly into engagement with the chuck, contacting against the conical under surface 23 so as to impart a retentive force against the tool holder or collet 7. A ring 17 may be provided on the chuck 4 to cover up the recess 12. At the top of the chuck a tapering recess 18 is provided for the purpose of receiving the spindle of a power driven machine.

Integrally formed with the conical portion 6 of the tool holder is a shank 19 which carries a drill or some other form of tool. Rotatably mounted on shank 19 is a sleeve 20 having a knurled outer surface. The shank 19 is provided with an end thrust ball race 21 at its upper end and with a lock ring 22 at its lower extremity which feature is described in more detail in my Patent No. 2,279,310, April 14, 1942.

In operation, the tool holder is inserted into the rotating chuck in the following manner: the operator takes hold of the tool holder 7 on the knurled surface of the freely rotatable sleeve 20 and inserts the conical portion 6 of the tool holder into the conical recess of the chuck. The conical surface of the tool holder acts to guide it into the chuck until the polygonally formed portion of the tool holder enters the correspondingly shaped receptacle space in the chuck and thereby is established a driving connection between the chuck and the tool holder causing rotation to be imparted to the latter member as it is held by the rotatable sleeve 20. As the tool holder is moved upwardly into the chuck in the latter part of its upward movement, the top portion of lead pin 10, which is shaped with a flared knob, pushes past the inwardly extending rounded extremities of the pins to urge the pins outwardly thence permitting them to return behind the retention knob of the lead pin. When the tool holder reaches the limit of its upward movement, the pins press inwardly to engage the groove portion 11 of the lead pin thereby retaining the tool holder in operating engagement with the chuck. The spring urged pins while retaining the tool holder in the chuck preferably engage only the upper beveled surface 23 of groove portion 11 of the lead pin which insures that the pins constantly urge the tool holder upwardly and keep it in engagement with the chuck. Because of the fact that sleeve 20 is freely rotatable, any tendency of the chuck to drive the tool holder while it is being inserted will not cause injury to the hand of the operator. An operator may remove the tool holder from the rotating chuck by simple grasping the knurled portion of the freely rotatable sleeve 19 and pulling the tool from the chuck.

Accordingly, the present invention provides a quick change device by means of which a tool holder may be attached to or disconnected from a machine tool while the machine is rotating or while it is at rest. A highly efficient yet simple quick-change device is provided for use with machine tools. Various changes and modifications might be made in the design outlined by the present invention without departing from the spirit and scope of the invention.

What is claimed is:

A chuck comprising in combination a rotatable body for securement to the spindle of a rotary machine providing concentric with its axis of rotation a conical recess and coextensive therewith a polygonal recess, a collet member cooperating with said body for carrying a machining tool comprising a conical portion and a polygonal portion conforming in shape and relation to the afore-described conical and polygonal recesses of said body, sleeve means for holding said collet member to permit its rotation during insertion into said body, and retaining apparatus for holding said collet within said body comprising a lead portion forming the foremost extremity of said polygonal portion of said member turned to afford an oppositely beveled knob, and spring pressed detent pins contained in said body and positioned axially for movement towards the under beveled surface of said knob, said polygonal portion of said collet being of such length as to be engaged and rotated by the polygonal recess of said body before the upper beveled surface of said knob comes into contactual engagement with said detent pins.

VICTOR GREY.